United States Patent
Albero et al.

(10) Patent No.: US 12,470,567 B2
(45) Date of Patent: *Nov. 11, 2025

(54) ESTABLISHING DYNAMIC EDGE POINTS IN A DISTRIBUTED NETWORK FOR AGNOSTIC DATA DISTRIBUTION AND RECOVERY

(71) Applicant: BANK OF AMERICA CORPORATION, Charlotte, NC (US)

(72) Inventors: George Anthony Albero, Charlotte, NC (US); Michael Robert Young, Davidson, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 356 days.

This patent is subject to a terminal disclaimer.

(21) Appl. No.: 17/854,554

(22) Filed: Jun. 30, 2022

(65) Prior Publication Data
US 2024/0007482 A1    Jan. 4, 2024

(51) Int. Cl.
| H04L 41/12 | (2022.01) |
| H04L 9/40 | (2022.01) |
| H04L 41/16 | (2022.01) |
| H04L 43/026 | (2022.01) |
| H04L 43/04 | (2022.01) |

(52) U.S. Cl.
CPC .......... *H04L 63/1408* (2013.01); *H04L 41/12* (2013.01); *H04L 41/16* (2013.01); *H04L 43/026* (2013.01); *H04L 43/04* (2013.01); *H04L 63/0428* (2013.01)

(58) Field of Classification Search
CPC .............. H04L 47/125; H04L 63/1441; G06Q 10/0635
See application file for complete search history.

(56) References Cited

U.S. PATENT DOCUMENTS

| 6,516,425 B1 | 2/2003 | Belhadj et al. |
| 7,447,839 B2 | 11/2008 | Uppala |
| 8,799,287 B1 | 8/2014 | Barile et al. |
| 9,448,887 B1 | 9/2016 | Ben Dayan et al. |
| 9,921,910 B2 | 3/2018 | Sangamkar et al. |
| 10,152,376 B2 | 12/2018 | Danilov et al. |
| 10,310,943 B2 | 6/2019 | Huang et al. |

(Continued)

*Primary Examiner* — Pramila Parthasarathy
(74) *Attorney, Agent, or Firm* — Moore & Van Allen PLLC; Gabrielle M. Carlini

(57) ABSTRACT

A system is provided for remediating computing system breaches by reversibly distributing data to a plurality of edge points in a distributed network. In particular, the system may intelligently track network data to predict breach vector pathways and may track various types of network traffic data for computing systems within the network. Based on the network traffic data, the system may generate a network topology, mapping the various types of network connections across the computing systems in the network environment as well as the datasets that were transferred across such connections. In the event of a system breach, the system may divide each dataset into a plurality of partial data packets. The system may transmit each partial data packet to a different user device or computing device in the network. After the breach is remediated, the system may recall the individual data packets and reassemble the datasets for future use.

11 Claims, 2 Drawing Sheets

(56) References Cited

U.S. PATENT DOCUMENTS

| | | | |
|---|---|---|---|
| 10,489,210 B2 | 11/2019 | Sangamkar et al. | |
| 10,509,708 B2 | 12/2019 | Xiang et al. | |
| 10,733,053 B1 | 8/2020 | Miller et al. | |
| 11,042,661 B2 | 6/2021 | Ben Dayan et al. | |
| 11,269,727 B2 | 3/2022 | Ben Dayan et al. | |
| 11,469,983 B1* | 10/2022 | Malov | H04L 41/142 |
| 2002/0194427 A1 | 12/2002 | Hashemi | |
| 2006/0041718 A1 | 2/2006 | Ulrich et al. | |
| 2012/0084600 A1 | 4/2012 | Kidney et al. | |
| 2012/0155453 A1* | 6/2012 | Vohra | H04L 47/17 |
| | | | 370/360 |
| 2012/0173932 A1 | 7/2012 | Li et al. | |
| 2012/0189009 A1* | 7/2012 | Shekhar | H04L 45/021 |
| | | | 370/392 |
| 2013/0275815 A1 | 10/2013 | De Keyser et al. | |
| 2014/0325262 A1 | 10/2014 | Cooper et al. | |
| 2015/0271702 A1* | 9/2015 | Jang | H04W 28/04 |
| | | | 370/216 |
| 2016/0011936 A1 | 1/2016 | Luby | |
| 2017/0308436 A1 | 10/2017 | Agombar et al. | |
| 2020/0153856 A1* | 5/2020 | Nainar | H04L 63/1458 |
| 2021/0075844 A1* | 3/2021 | Arikuma | H04L 65/1076 |
| 2021/0216928 A1* | 7/2021 | O'Toole | G06F 16/29 |
| 2023/0359386 A1* | 11/2023 | Saha | G06F 9/542 |

* cited by examiner

200 

DETECT A TOPOLOGY OF ONE OR MORE COMPUTING SYSTEMS IN A NETWORK

RETRIEVE ONE OR MORE HISTORICAL NETWORK TRAFFIC LOGS FROM THE ONE OR MORE COMPUTING SYSTEMS IN THE NETWORK
202

BASED ON THE ONE OR MORE HISTORICAL NETWORK TRAFFIC LOGS, DETECT ONE OR MORE DATA TRANSFERS BETWEEN THE COMPUTING SYSTEMS
203

GENERATE A RANKED LIST OF LIKELIEHOOD SCORES FOR EACH OF THE ONE OR MORE DATA TRANSFERS
204

BASED ON THE RANKED LIST OF LIKELIHOOD SCORES, AUTOMATICALLY IMPLEMENT ONE OR MORE REMEDIATION STEPS ASSOCIATED WITH THE VECTOR
205

FIG. 2

ESTABLISHING DYNAMIC EDGE POINTS IN A DISTRIBUTED NETWORK FOR AGNOSTIC DATA DISTRIBUTION AND RECOVERY

FIELD OF THE INVENTION

The present disclosure embraces a system for remediating the effects of computing system breaches via agnostic data distribution throughout a distributed network.

BACKGROUND

There is a need for a way to automatically and reversibly distribute data throughout a meshed network in order to mitigate the effects of computing system breaches on said data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for remediating computing system breaches by reversibly distributing data to a plurality of edge points in a distributed network. In particular, the system may intelligently track network data to predict breach vector pathways and may track various types of network traffic data for computing systems within the network. Based on the network traffic data, the system may generate a network topology, mapping the various types of network connections across the computing systems in the network environment as well as the datasets that were transferred across such connections. In the event of a system breach, the system may divide each dataset into a plurality of partial data packets. The system may transmit each partial data packet to a different user device or computing device in the network. After the breach is remediated, the system may recall the individual data packets and reassemble the datasets for future use.

Accordingly, embodiments of the present disclosure provide a system for remediating computing system breaches by reversibly distributing data. The system may comprise a memory device with computer-readable program code stored thereon; a communication device; and a processing device operatively coupled to the memory device and the communication device. The processing device may be configured to execute the computer-readable program code to identify a breach vector within a network; generate a ranked list of likelihood scores for each of one or more datasets within the network, where the likelihood scores reflect a likelihood of the breach vector affecting the one of more datasets; divide each of the one or more datasets into a plurality of partial data packets; and transmit each one of the plurality of partial data packets to a different computing device of a plurality of computing devices within the network.

In some embodiments, the invention further includes dividing each of the one or more datasets into a plurality of partial data packets based on the likelihood score for each dataset, where a higher likelihood score results in a greater number of partial data packets.

In some embodiments, the invention further includes encrypting each partial data packet.

In some embodiments, the invention further includes determining that the breach vector is not active within the network; receiving a data transmission of each partial data packet from the plurality of computing devices within the network; and rebuilding each of the one or more datasets within the network from the plurality of partial data packets.

In some embodiments, the invention further includes detecting a topology of the plurality of computing devices in the network; retrieving one or more historical network traffic logs from the plurality of computing devices in the network; and based on the one or more historical network traffic logs, detecting one or more data transfers within the plurality of computing devices in the network, where each data transfer comprises a dataset.

In some embodiments, the one or more historical network traffic logs includes an origin network traffic log and a destination network traffic log, where detecting the one or more data transfers includes: identifying, from the origin network traffic log, one or more outgoing data transfers from one of the plurality of computing devices in the network; and matching, using the destination network traffic log, the one or more outgoing data transfers with one or more incoming data transfers from one of the plurality of computing devices in the network.

In some embodiments, generating the ranked list of likelihood scores includes: identifying one or more parameters associated with the one or more data transfers; and computing increases or decreases to the likelihood scores based on the one or more parameters.

In some embodiments, each different computing device of the plurality of computing devices within the network is a user device associated with a user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
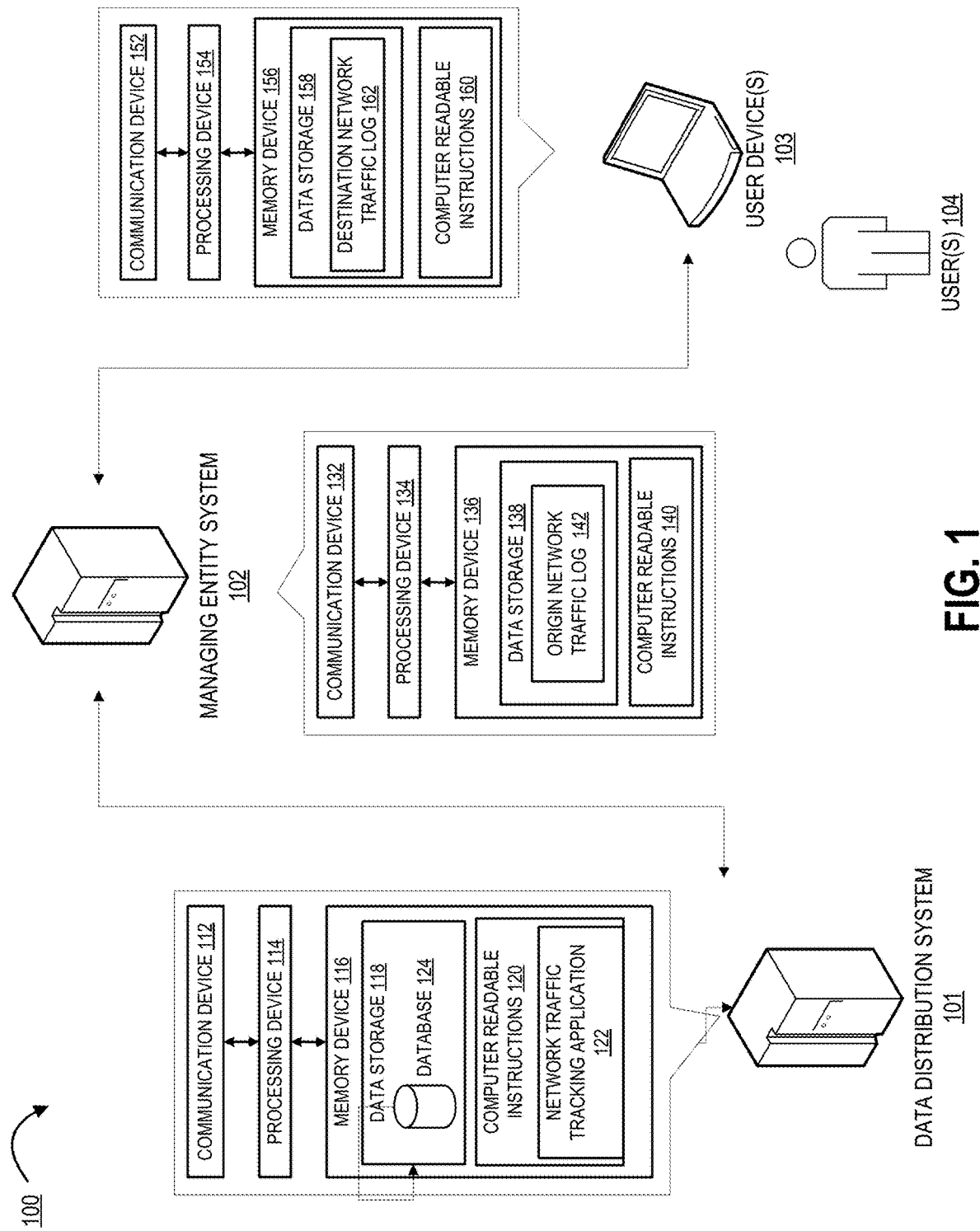

Having thus described embodiments of the invention in general terms, reference will now be made to the accompanying drawings, wherein:

FIG. 1 illustrates an operating environment for the data distribution system, in accordance with one embodiment of the present disclosure; and FIG. 2 illustrates a process flow for the data distribution system, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Breach vector" or "vector" as used herein may refer to an object or method through which an unauthorized user, device, or code may gain access to a computing system. Examples of such breach vectors may include computer viruses, malware, security vulnerabilities, or the like. Accordingly, in some embodiments, breach vectors may be transmitted or spread from an infected technology element to one or more destination technology elements (e.g., through a network connection).

"Network traffic" as used herein may refer to the various types of data that may be received and transmitted across the network by computing systems within the network. Accordingly, "network traffic data" as used herein may refer to records or logs regarding and/or associated with the network traffic between computing systems within the network.

"Network segmentation" or "segmentation" as used herein may refer to a process for using physical or logical boundaries to separate hardware and/or software objects from one another within a network to create subsections of the network. Examples of segmentation methods or implements may include routers, switches, physical cable disconnects, wireless jammers, firewall rules, virtual local area networks (VLAN), and the like. Segmentation may be carried out at macro levels (e.g., data centers, geographic regions, or the like) and/or at the micro level (specific computing systems, hardware devices, and/or data).

Computing systems in a network environment may transmit and/or receive various types of data to and/or from one another and/or other computing systems that may exist outside of the network environment. For example, computing systems may transmit and/or receive entity-specific data, such as data associated with operations of the entity and/or entity system. Computing systems may also transmit and/or receive personal data, such as data associated with a particular user of the system or any data identifying a specific human being. In such scenarios, a computing system may be affected by a breach vector such as a computer virus, which may compromise entity-specific data, personal data, and/or the like. Accordingly, it may be desirable to track the network traffic between computing systems in the network environment to determine the vulnerable surfaces as well as the pathways that a breach vector may take when infecting certain computing systems. In addition, it may be desirable to remove data from a network environment after a breach vector has been identified. Preferably, the removed data would be recoverable such that it could be returned to the network environment after a breach vector has been remediated.

In this regard, the system as described herein provides a system for reversibly distributing data to a plurality of edge points in a distributed network. In particular, the system may intelligently track network data to predict breach vector pathways and may track various types of network traffic data for each computing system within the network to generate network traffic logs for each computing systems, where the network traffic data may include information regarding what types of data and/or network interactions occurred with respect to each computing system. For instance, the network traffic data may include outgoing and/or incoming network traffic data which may include information regarding data that was sent from a particular computing system (e.g., downstream and/or upstream technology element, network traffic type, network protocol used, IP addresses, hardware addresses, network port used, duration of connection, computing system hardware and/or software metadata, and the like). In some embodiments, the individual log data may be stored within each computing system and aggregated by the system on an as-needed basis to perform the predictive and/or remediation processes as described herein.

Based on the network traffic data, the system may generate a network topology which maps the various types of network connections that were established across the computing systems in the network environment as well as the types of data that were transferred across such connections. For example, upon detecting that a breach vector has affected a certain computing system, the system may examine the network traffic logs of the affected computing system to determine which types of data may be affected by the breach vector, such as entity-specific data, personal data, and/or the like.

In some embodiments, the system may perform a likelihood calculation of the various network connections and/or interactions to determine the which data stored in the network is likely to be affected a particular breach vector by using historical data within the network traffic logs of affected computing systems. In addition to logs of the actual traversal of the breach vectors, the system may calculate a likelihood score which indicates the likelihood that a breach vector may traverse technology elements along a particular pathway. For instance, a File Transfer Protocol ("FTP") connection to transfer an executable file on port 21 from a file server to a desktop computer may have a relatively higher likelihood of containing entity-specific information (and accordingly, a higher likelihood score) than web traffic on port 80 from a web server to a desktop computer (which may have a relatively lower likelihood score). In some embodiments, the likelihood score calculations may be dynamically adjusted using machine learning algorithms which may track actual traversals of breach vectors to increase or decrease likelihood scores for certain data types according to the observed data. In some embodiments, the system may further incorporate information from external intelligence feeds on breach vectors (e.g., information on modes of infection and/or intended purposes of certain breach vectors) in generating the likelihood score. For example, the intelligence feed may indicate that a particular breach vector is commonly used to identify sets of usernames and passwords. Accordingly, data sets containing user passwords may have an increased likelihood score with respect to the identified breach vector.

An exemplary use case is provided for illustrative purposes. In one exemplary embodiment, the system may detect that a server in the network has been affected by a vector such as a computer virus. Based on the network topology, the system may generate a ranked list of network traffic data that may be most likely to be affected by the computer virus. In this regard, the system may use external or internal intelligence feeds to calculate a probability of transmission through certain types of network traffic. For example, the intelligence data may indicate that the computer virus affects entity-specific data used in a particular software application and is most likely to spread through file transfers on port 21.

Accordingly, the system may perform likelihood calculations for each data set stored at the server and at the various computing devices with which the server has had contact. To illustrate, the server may have transferred an executable file on port 21 to a desktop computer running a first operating system, where said file may be represented by a first variable. The same server may have also transferred web data (e.g., HTML files, image files, and the like) on port 80 to a laptop computer running a second operating system, where said web data may be represented by a second variable. Based on the type of file transfer (e.g., transfer of an executable file versus web data), the port used to connect the systems, the intelligence feed data (e.g., data showing that the first data type is more vulnerable than the second data type), the system may calculate a higher likelihood score for the first variable and a lower likelihood score for the second variable. The likelihood scores may then be included in a ranked list that may be ordered based on likelihood scores of the data being compromised (e.g., from highest to lowest). In calculating the likelihood scores, the system may further take into account historical scoring and/or rankings and adjust the scoring algorithms over time (e.g., via machine learning) such that the accuracy of the likelihood scores continue to increase.

Based on the generated list of likelihood scores, the system may automatically implement one or more remediation steps to prevent loss of data. In some embodiments, certain remediation steps may be executed if a given likelihood score exceeds a certain threshold. In some embodiments, a likelihood score may be used as a multiplier to weight the degree of protection provided to a particular data set. The system may be configured to implement remediation steps in an escalating order of disruption to the affected systems and/or networks. For instance, the system may first identify the vulnerable data sets (e.g. data with likelihood scores above a predetermined threshold) and may virtually "shred" the data by randomly dividing the data set into encrypted, partial data packets. Each data packet may then be transferred to a different computing device or user device on the network for storage until the breach vector is remediated. The system may use the likelihood score for each data set to determine how many times to divide the data. For example, data sets with high likelihood scores may be divided into many partial data packets, each containing several bits. Data sets with low likelihood scores may be divided into fewer partial data packets (e.g., a sales report may be divided into two data packets, one containing sales data and one containing individual employee names). Additionally or alternatively, the system may use the likelihood score for each data set to determine where in the network environment to send the partial data packets. For example, data sets with high likelihood scores may be transferred as partial data packets to a plurality of user devices associated with the entity, with each user device being located remotely from the other user devices. Data sets with lower likelihood scores may be transferred as partial data packets to computing devices or user devices on the same network as each other.

The system as described herein confers a number of technological advantages over conventional network security systems. In particular, by using historical data in conjunction with machine learning algorithms, the system may dynamically predict the potential pathways of incoming vectors, thereby allowing the system to more effectively protect the data most likely to be affected by such vectors. Furthermore, by automatically dividing and distributing data based on likelihood scores, the system provides a way to seamlessly and efficiently address security issues in the network environment without permanent data loss.

Turning now to the figures, FIG. 1 illustrates an operating environment 100 for the data distribution system, in accordance with one embodiment of the present disclosure. In particular, FIG. 1 illustrates a data distribution system 101 that is operatively coupled, via a network, to a managing entity system 102 and/or a user device 103. In such a configuration, the data distribution system 101 may transmit information to and/or receive information from the managing entity system 102 and/or a user device 103. It should be understood that FIG. 1 illustrates only an exemplary embodiment of the operating environment 100, and it will be appreciated that the operating environment 100 may comprise a fewer or greater number of computing systems and/or devices than are depicted in FIG. 1. For example, though the FIG. 1 depicts a managing entity system 102 and a user device 103, some embodiments may include multiple user devices 103 in the network environment. In addition, the managing entity system 102 may comprise a plurality of discrete computing devices and/or servers. Furthermore, it will be appreciated by those skilled in the art that network traffic may be bidirectional between computing systems. Additionally or alternatively, the user device 103 may be a separate computing system from the managing entity system 102 as depicted, or the user device 103 may be fully integrated within the same computing system as the managing entity system 102.

It should also be understood that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the data distribution system 101 is depicted as a single unit, the functions of the data distribution system 101 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the data distribution system 101 may be a networked server, desktop computer, laptop computer, routing device, or other type of computing system within the network environment which performs the processes for tracking network data, reading network traffic logs, generating and/or maintaining a network topology information, generating likelihood scores, implementing remediation processes including data packet generation and encryption, and the like, as described herein. Accordingly, the data distribution system 101 may comprise a processing device 114 operatively coupled to a communication device 112 and a memory device 116 having data storage 118 and computer readable instructions 120 stored thereon.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 may use the communication device 112 to communicate with the network and other devices on the network, such as, but not limited to the managing entity system 102 and/or the user device 103. Accordingly, the communication device 112 generally comprises one or more hardware components such as a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise a database 124, which may comprise information regarding the topology of the network, information about various nodes within the network and/or the types of network traffic that may pass between such nodes, intelligence on vectors that may compromise the nodes, and the like. Accordingly, in one embodiment, the database 124 may comprise the network topology associated with the various computing systems in the network, the relationships between the computing systems (e.g., the types of data transmitted back and forth between the nodes), and the like. The database 124 may further comprise historical data regarding the monitored traffic within the network, which in turn may be used to drive the processes for generating likelihood scores for the data stored within the network, as described elsewhere herein. It should be understood that in alternative embodiments, the database 124 may be hosted on a separate computing system (e.g., a database server) instead of being hosted on the data distribution system 101.

The memory device 116 may have computer-readable instructions 120 stored thereon, where the computer-readable instructions 120 may comprise a network traffic tracking application 122, which may comprise computer-executable program code which may instruct the processing device 114 to perform certain logic, data processing, and data storing functions of the application to accomplish the entity's objectives. For instance, the network traffic tracking application 122 may monitor the network traffic within the managing entity system 102 and between the managing entity system 102 and the user device 103 to identify and predict potential lateral movement of vectors that may affect data stored within the managing entity system 102 and/or the user device 103. In this regard, the network traffic tracking application 122 may pull data from the database 124 to perform likelihood calculations for each data set stored within the managing entity system 102 and the user device 103.

As further illustrated in FIG. 1, the operating environment 100 may further comprise a managing entity system 102 in operative communication with the data distribution system 101. In particular, the managing entity system 102 may be a computing system from which a vector (e.g., a computer virus) may spread to other devices in the network (e.g., the user device 103). Accordingly, the managing entity system 102 may be a computing system such as a server or networked terminal, though it is within the scope of the disclosure for the managing entity system 102 to be one or more devices such as a desktop computer, laptop, IoT device, smartphone, tablet, single-board computer, or the like, or the managing entity system 102 may be one or more hardware or software elements of one of said devices (i.e. a software application, camera, microphone, and/or the like.)

The managing entity system 102 may comprise a processing device 134 operatively coupled to a communication device 132 and a memory device 136 having data storage 138 and computer readable instructions 140 stored thereon. The data storage 138 may comprise an origin network traffic log 142, which may comprise a historical record of network traffic data sent and/or received by the upstream technology element 102. For instance, in embodiments in which the managing entity system 102 is a web server, the origin network traffic log 142 may comprise a record of an incoming web data request on port 80 from the user device 103, and another record of outgoing web data to the user device 103.

In some embodiments, the operating environment 100 may further comprise a user device 103. The user device 103 may be a computing system within the network environment that may serve as the destination for network data transmitted from the managing entity system 102. In some embodiments, the user device 103 may be a computing system that is operated by a user 104, such as an administrator or employee of the entity. Accordingly, the user device 103 may be a computing system such as a desktop computer, laptop computer, smartphone or smart device, tablet, single board computer, or the like, though it is within the scope of the disclosure for the user device 103 to be any other kind of computing system as described herein (e.g., a "headless" computing system such as a server). Additionally or alternatively, the user device 103 may be a hardware or software element of one of said devices (i.e. a software application, input device, output device, and/or the like). The user device 103 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like) for interacting with the user 104.

In this regard, the user device 103 may comprise a processing device 154 operatively coupled to a communication device 152 and a memory device 156 comprising data storage 158 and computer readable instructions 160. The data storage 158 of the user device 103, similar to that of the managing entity system 102, may comprise a destination network traffic log 162 which may contain a historical log of data sent and/or received by the user device 103. Continuing the above example, the destination network traffic log 162 may contain a record indicating that the user device 103 has downloaded web data on port 80 from the managing entity system 102. By reading the origin network traffic log 142 and the destination network traffic log 162, the data distribution system 101 may generate a topology of the network, identify transmitted data, calculate likelihood scores, and implement remediation processes on the managing entity system 102 and/or the user device 103 according to the calculated likelihood scores. Accordingly, in some embodiments, the data distribution system 101 may be configured to hook into the process command loop of the managing entity system 102 and/or the user device 103 to implement remediation steps (e.g., diving data into partial data packets, encrypting partial data packets, determining network locations for transmission of partial data packets and/or the like).

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the technology elements may access one or more databases or datastores (not shown) to search for and/or retrieve information related to the service provided by the entity. The technology elements may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

Each computing system in the operating environment 100 may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems. The data distribution system 101 may be in operative communication with a control system of a computing system to implement remediation steps (e.g., diving data into partial data packets, encrypting partial data packets, determining network locations for transmission of partial data packets and/or the like).

FIG. 2 illustrates a process flow 200 for tracking, predicting, and remediating computing system breaches by reversibly distributing partial data packets, in accordance with some embodiments of the present disclosure. The process begins at block 201, where the system detects a topology of one or more computing systems in a network. In this regard, the computing systems may be computing systems or hardware or software elements of computing systems that may have a unidirectional and/or bidirectional flow of network traffic. In some embodiments, a managing entity system or a user device may be a computing system or an element of a computing system which may be the origination point or source that may first become compromised by a vector.

In an exemplary embodiment, one computing systems may be a server on the network that may host one or more data files to be transferred to one or more user devices (e.g., a web server), whereas another computing system may be a user device that may be operated by the user to access the one or more data files stored within the server. In such a scenario, the system may detect the relationship between the server and the user device and detect a data type, or dataset, that is transferred between the server and the user device.

The process continues to block 202, where the system retrieves one or more historical network traffic logs from the one or more computing systems in the network. In particular, the system may retrieve a historical network traffic log from a first computing system (e.g., an origin network traffic log) and/or a second computing system (e.g., a destination network traffic log). The network traffic log may indicate the network traffic transmitted to other computing systems and/or received from other computing systems. Accordingly, each computing system within the network may host its own network traffic log. By reading the network traffic logs of each computing system, the system may be able to determine the topology of the network.

The process continues to block 203, where the system, based on the one or more historical network traffic logs, detects one or more data transfers between computing systems. In this regard, the system may read the origin network traffic log to determine what data transfers have occurred between the first computing system and second computing system. In some embodiments, the system may further read the destination network traffic log and perform a validation check on the origin network traffic log using the destination network traffic log. Continuing the above example, the origin network traffic log may indicate that an executable file was transferred from the first computing system to the second computing on network port 21. The system may then search the destination network traffic log for a record of the file transfer according to the origin network traffic log.

The process continues to block 204, where the system generates a ranked list of likelihood scores for each dataset involved in the one or more data transfers, wherein the likelihood scores reflect a likelihood of that dataset or similar datasets to be compromised by a breach vector. In this regard, the system may use an artificial intelligence-based machine learning algorithm to evaluate various parameters associated with each dataset and calculate the likelihood scores based on the parameters. Each likelihood score may be associated with a particular vector to be tracked by the system. Examples of such parameters may include historical data on vectors, intelligence data on vectors, the type of data transferred (e.g., executable files, image files, video files, or the like), data sensitivity (e.g. public, entity-specific, private, etc.), data transfer frequency, software and/or hardware configurations, application and/or operating system versions, or the like.

Once the parameters have been identified, the system may compute increases or decreases to the likelihood scores based on the parameters. Accordingly, a data transfer that includes a file transfer of an executable file may have a comparatively higher likelihood score than a transfer of an image. The likelihood score may further increase, for instance, if the computing systems are running vulnerable operating systems, have outdated anti-malware software and/or definitions, have high transfer frequencies to other computing systems, or the like. In some embodiments, the likelihood score may further increase based on the magnitude of potential ramifications of infection by a certain vector. For example, a data transfer that may result in loss or leaking of highly sensitive data, such as personal data, may be assigned a higher likelihood score.

Once the system has generated likelihood scores for the various datasets within the network, the system may order the likelihood scores into a ranked list of likelihood scores. In some embodiments, the likelihood scores may be arranged in a decreasing order with higher likelihood scores appearing first in the ranked list. In other words, the ranked list of likelihood scores may be a list of datasets or data types, ordered according to the likelihood of transmission of a particular vector and/or the potential ramifications of transmission of said vector.

The process concludes at block 205, where the system, based on the ranked list of likelihood scores, automatically implements one or more remediation steps associated with the vector. The one or more remediation steps may be dependent on the type of vector associated with the likelihood scores and/or the characteristics or properties of the technology elements for which the likelihood scores were calculated. In some embodiments, the system may divide each dataset into a plurality of partial data packets, wherein the number of partial data packets is correlated to the likelihood score of each dataset. In some embodiments, each partial data packet may be encrypted. The system may then transmit each partial data packet to a different user device or computing device in the network. After the breach vector is remediated, the system may then recall the individual data packets and reassemble the datasets for future use. The remediation steps may, in some embodiments, be applied or executed without any input required from a user. In this way, the system provides a dynamic and efficient way to remediate the possibility of vector transmission across the computing systems and technology elements in the network environment.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for remediating computing system breaches by reversibly distributing data, the system comprising:
   a memory device with computer-readable program code stored thereon;
   a communication device; and
   a processing device operatively coupled to the memory device and the communication device, wherein the processing device is configured to execute the computer-readable program code to:
   detect a topology of a plurality of computing devices in the network by:
      identifying, from the origin network traffic log, one or more outgoing data transfers from one of the plurality of computing devices in the network; and
      matching, using the destination network traffic log, the one or more outgoing data transfers with one or more incoming data transfers from one of the plurality of computing devices in the network;
   retrieve one or more historical network traffic logs from the plurality of computing devices in the network, wherein the one or more historical network traffic logs comprises an origin network traffic log and a destination network traffic log;
   based on the one or more historical network traffic logs, detect one or more data transfers within the plurality of computing devices in the network, wherein each data transfer comprises one or more datasets;
   identify a breach vector within a network;
   generate a ranked list of likelihood scores for each of the one or more datasets, wherein the likelihood scores reflect a likelihood of the breach vector affecting the one or more datasets and wherein the likelihood scores are dynamically adjusted based on one or more intelligence feeds external to the network;
   based on one or more likelihood scores of the ranked list of likelihood scores exceeding a predetermined threshold value, divide each of the one or more datasets into a plurality of partial data packets, wherein each partial data packet comprises a variable size;
   encrypt each partial data packet;
   transmit each one of the plurality of partial data packets to a different computing device of a plurality of computing devices outside of the network, such that no two partial data packets are transmitted to a same computing device;
   determine that the breach vector is not active within the network;
   recall each partial data packet from the plurality of computing devices outside of the network; and
   rebuild each of the one or more datasets within the network from the plurality of partial data packets.

2. The system of claim 1, wherein the processing device is further configured to divide each of the one or more datasets into a plurality of partial data packets based on the likelihood score for each dataset, wherein a higher likelihood score results in a greater number of partial data packets.

3. The system of claim 1, wherein generating the ranked list of likelihood scores comprises:
   identifying one or more parameters associated with the one or more data transfers; and
   computing increases or decreases to the likelihood scores based on the one or more parameters.

4. The system according to claim 1, wherein each different computing device of the plurality of computing devices outside of the network comprises a user device associated with a user.

5. A computer program product for remediating computing system breaches by reversibly distributing data, the computer program product comprising at least one non-transitory computer readable medium having computer-readable program code portions embodied therein, the computer-readable program code portions comprising executable code portions for:
   detecting a topology of a plurality of computing devices in the network by:
      identifying, from the origin network traffic log, one or more outgoing data transfers from one of the plurality of computing devices in the network; and
      matching, using the destination network traffic log, the one or more outgoing data transfers with one or more incoming data transfers from one of the plurality of computing devices in the network;
   retrieving one or more historical network traffic logs from the plurality of computing devices in the network, wherein the one or more historical network traffic logs comprises an origin network traffic log and a destination network traffic log;
   based on the one or more historical network traffic logs, detecting one or more data transfers within the plurality of computing devices in the network, wherein each data transfer comprises one or more datasets;
   identifying a breach vector within a network;
   generating a ranked list of likelihood scores for each of the one or more datasets, wherein the likelihood scores reflect a likelihood of the breach vector affecting the one of more datasets and wherein the likelihood scores are dynamically adjusted based on one or more intelligence feeds external to the network;

based on one or more likelihood scores of the ranked list of likelihood scores exceeding a predetermined threshold value, dividing each of the one or more datasets into a plurality of partial data packets, wherein each partial data packet comprises a variable size;

encrypting each partial data packet;

transmitting each one of the plurality of partial data packets to a different computing device of a plurality of computing devices outside of the network, such that no two partial data packets are transmitted to a same computing device;

determining that the breach vector is not active within the network;

recalling each partial data packet from the plurality of computing devices outside of the network; and rebuilding each of the one or more datasets within the network from the plurality of partial data packets.

6. The computer program product of claim 5, wherein the computer-readable program code portions further comprise executable code portions for dividing each of the one or more datasets into a plurality of partial data packets based on the likelihood score for each dataset, wherein a higher likelihood score results in a greater number of partial data packets.

7. The computer program product of claim 5, wherein generating the ranked list of likelihood scores comprises:
   identifying one or more parameters associated with the one or more data transfers; and
   computing increases or decreases to the likelihood scores based on the one or more parameters.

8. The computer program product of claim 5, wherein each different computing device of the plurality of computing devices outside of the network comprises a user device associated with a user.

9. A computer-implemented method for remediating computing system breaches by reversibly distributing data, wherein the computer-implemented method comprises:
   detecting a topology of a plurality of computing devices in the network by:
      identifying, from the origin network traffic log, one or more outgoing data transfers from one of the plurality of computing devices in the network; and
      matching, using the destination network traffic log, the one or more outgoing data transfers with one or more incoming data transfers from one of the plurality of computing devices in the network;
   retrieving one or more historical network traffic logs from the plurality of computing devices in the network, wherein the one or more historical network traffic logs comprises an origin network traffic log and a destination network traffic log;
   based on the one or more historical network traffic logs, detecting one or more data transfers within the plurality of computing devices in the network, wherein each data transfer comprises one or more datasets;
   identifying a breach vector within a network;
   generating a ranked list of likelihood scores for each of the one or more datasets within the network, wherein the likelihood scores reflect a likelihood of the breach vector affecting the one of more datasets and wherein the likelihood scores are dynamically adjusted based on one or more intelligence feeds external to the network;
   based on one or more likelihood scores of the ranked list of likelihood scores exceeding a predetermined threshold value, dividing each of the one or more datasets into a plurality of partial data packets, wherein each partial data packet comprises a variable size;
   encrypting each partial data packet;
   transmitting each one of the plurality of partial data packets to a different computing device of a plurality of computing devices outside of the network, such that no two partial data packets are transmitted to a same computing device;
   determining that the breach vector is not active within the network;
   recalling each partial data packet from the plurality of computing devices outside of the network; and
   rebuilding each of the one or more datasets within the network from the plurality of partial data packets.

10. The computer-implemented method of claim 9, further comprising dividing each of the one or more datasets into a plurality of partial data packets based on the likelihood score for each dataset, wherein a higher likelihood score results in a greater number of partial data packets.

11. The computer-implemented method of claim 9, wherein generating the ranked list of likelihood scores comprises:
   identifying one or more parameters associated with the one or more data transfers; and
   computing increases or decreases to the likelihood scores based on the one or more parameters.

* * * * *